United States Patent Office 2,807,628
Patented Sept. 24, 1957

2,807,628
BENZOXAZEPINE COMPOUNDS AND METHOD OF PRODUCING SAME

Bernard Belleau, Newark, N. J., assignor to (Reed & Carnrick Division of) Corega Chemical Company, Jersey City, N. J., a corporation of Ohio No Drawing. Application April 18, 1955,
Serial No. 502,213

7 Claims. (Cl. 260—333)

The present invention relates generally to improved organic chemical compounds and to the method of producing same. In particular, it relates to improved, therapeutically active organic chemical compounds, and to the method of producing same.

It is a principal object of the present invention to provide new and improved organic chemical compounds.

Another object of the present invention is to provide new and improved therapeutically active organic chemical compounds.

Still another object of the present invention is to provide new and improved organic chemical compounds which are highly useful in the treatment of diseases and organic disorders.

A further object of the present invention is to provide an improved method of producing therapeutically active organic chemical compounds.

The above and other objects of the present invention will become apparent from a reading of the following description which sets forth preferred embodiments of the present invention.

The present invention, in a broad sense, contemplates the provision of an improved and novel organic chemical compound consisting of the base of the general formula 2,3,4,5-tetrahydrobenzoxazepine-1,4. This base is structurally

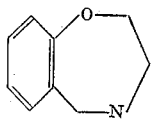

In the form of 2,3,4,5-tetrahydro-4-(beta halo alkyl)benzoxazepine-1,4, this compound is therapeutically very highly active. Its structure in this form is

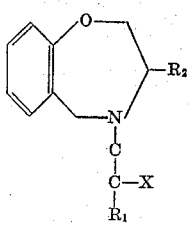

where $R_1$ is hydrogen, an aryl group or an alkyl group preferably not exceeding 5 carbons, $R_2$ is an aryl or alkyl group and X is a halogen.

It has been discovered that these improved novel compounds are adrenergic blocking agents which possess the property of preventing impulse transmissions along the sympathetic nerve system pathways. These compounds also possess anticholenergic activity which prevents those nerve impulses arising from cholenesterase. They are also adrenolytic and prevent vasoconstriction and nerve impulse transmission incited by epinephrin stimulation. They are furthermore antihistaminic and have the property of preventing histamine-induced spasms in the living body.

In accordance with one method of producing the novel compounds, saligenin, unsubstituted or substituted in the benzene ring or on the hydroxymethyl carbon, is reacted with a halohydrin of the general formula $R_1CHXCH(OH)R_2$, where $R_1$ and $R_2$ are hydrogen or alkyl groups. The hydroxyl groups of the reaction product are substituted by halogens, and a beta-hydroxyl-alkyl amine is substituted for the primary halogen. The resulting product is cyclized, and a halogen substituted for the hydroxyl group, to produce 2,3,4,5-tetrahydro-4-(beta-halo-alkyl) benzoxazepine-1,4.

The following example is for the preparation specifically of 3-methyl-4-((beta-chloro-ethyl)-2,3,4,5-tetrahydro-1-4 benzoxazepine, which particular compound has been found to be therapeutically highly active.

*First step.—Preparation of o-(2-hydroxy-n-propoxybenzyl alcohol.*—633 grams of saligenin were dissolved in 1 liter of 95% ethanol containing a solution of 210 grams of sodium hydroxide in 200 milliliters of water. The solution was heated under reflux, and while stirring 490 grams of propylene chlorohydrin was added, dropwise, over a period of three hours. After the addition was complete, the mixture was heated under reflux for an additional six hours and then most of the solvent alcohol distilled off. The residue was treated with 1 liter of water and the oil extracted with ether. The ether extract was washed with a 5% aqueous sodium hydroxide solution, then dried over sodium sulfate and the solvent ether distilled off. The residue was fractionated in vacuo and the portion distilling at 165–180° C./0.5–7 mm. was collected. The yield was 732 grams, or 78% of the theoretical yield.

*Second step.—Preparation of o-(2-chloro-n-propoxybenzyl chloride.*—The preceding 732 grams of material were dissolved in 1500 milliliters of chloroform containing 650 grams of pyridine and cooled in ice. To this was added, while stirring, 1000 grams of thionyl chloride over a period of three hours. The mixture was then heated under reflux for two hours, cooled and poured into water. The chloroform layer was collected, washed with several portions of 5% aqueous sodium hydroxide, dried over sodium sulfate and the solvent chloroform removed by distillation on a steam-bath. The residue was distilled in vacuo and the fraction boiling at 144–145° C./3–4 mm. collected. The yield was 721 grams, or 82% of the theoretical yield.

*Third step.—Preparation of o-(2-chloro-n-propoxy-N-(2-hydroxyethyl) benzyl amine.*—To 621 grams of the preceding dichloride in 400 milliliters of ethanol 350 grams of freshly distilled ethanolamine were added dropwise with vigorous stirring over a one hour period. The mixture was kept at 30–60° C. by cooling with tap water. Stir an additional two hours and let stand overnight. The mixture was poured into water and the oil extracted with ether. The ether extract was washed with water and extracted with 5% aqueous hydrochloric acid. The acid extract was made alkaline with concentrated sodium hydroxide solution and the oil extracted with ether. The ether extract was dried over sodium sulfate and evaporated at 100° C. in vacuo. There were left 600 grams of amino derivative. The yield is 86% of the theoretical yield.

*Fourth step.—Preparation of 4-(2-hydroxyethyl-3-methyl-2,3,4,5-tetrahydro-1,4-benzoxazepine.*—The preceding 600 grams of amine were dissolved in 1500 milliliters of propylene glycol and 176 grams of anhydrous potassium carbonate added. The mixture was stirred and heated under reflux for six hours. The solvent was removed by distillation in vacuo and the residue treated with 5% aqueous hydrochloric acid and shaken vigorously. The acid solution was decanted from a thick gum and washed once with 250 milliliters of chloroform. The clear acid solution was made alkaline with aqueous sodium hydroxide and extracted with benzene. The benzene extract was dried and evaporated and the residue fractionated in vacuo to yield 101 grams of material boiling at 135–137° C./0.15 mm. The yield amounts to 20% of the calculated yield.

*Fifth step.—Preparation of 4-(2-chloroethyl-3-methyl-2,3,4,5 - tetrahydro - 1,4 - benzoxazepine hydrochloride.—* The 101 grams of product resulting from the preceding step were dissolved in 250 milliliters of dry chloroform, the solution cooled in ice and treated dropwise while stirring with 59 grams of purified thionyl chloride over a period of one hour. The mixture was then heated, allowed to stand two hours and the solvents removed by distillation in vacuo. The residue was dissolved in 500 milliliters of hot acetone, the solution cooled to 0° C. for 24 hours, filtered and the precipitate washed with 70:30 ethyl acetate-acetone mixture until no more color is washed off. The crystals are recrystallized from acetone-ethyl acetate mixture, the crystals washed again with 70:30 ethyl acetate-acetone mixture until colorless and air-dried to yield 50 grams of 4-(2-chloroethyl-3-methyl-2,3,4,5 - tetrahydro-1,4 - benzoxazepine hydrochloride. M. P. 175° C. An additional 1 to 2 grams can be recovered from the mother liquors by concentrating and crystallizing. The yield is 40% of the theoretical yield, although as high as 50% has already been obtained in previous runs.

The process steps can be illustrated as follows:

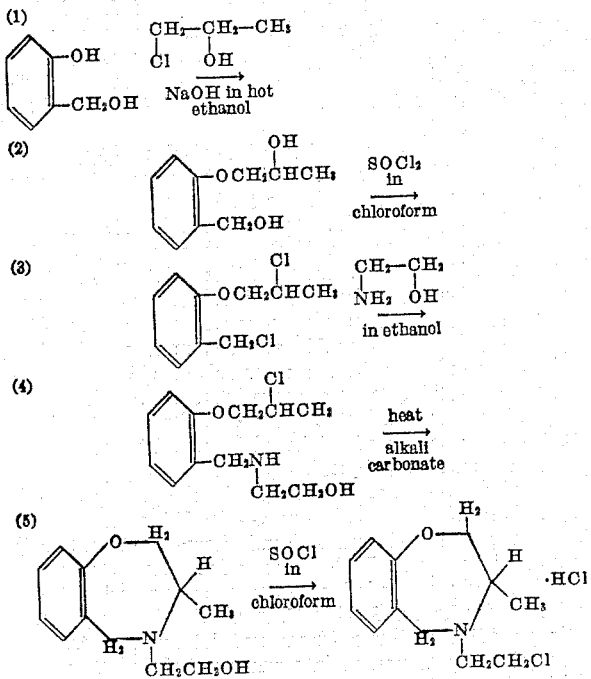

In the first step, in place of the saligenin, a compound in which the benzene hydrogens or one of the hydrogens attached to the hydroxymethyl carbon may be substituted as by methyl, ethyl or isopropyl, halogen and alkoxy groups on the benzene ring and by an alkyl group not higher than 5 carbons on the hydroxymethyl carbon, for example

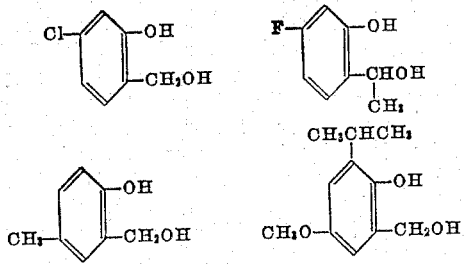

may be employed. In place of the propylene chlorohydrin, other chlorohydrins or halohydrins may be used, for example

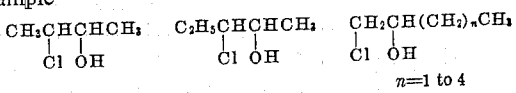

$n=1$ to $4$

The reaction may be effected in other suitable environments than NaOH in ethanol.

In the second and fourth steps, any conventional, suitable halogen substitution reaction may be used as is well known in the art.

In the third step, other beta hydroxyalkyl amines may be employed, such as for example

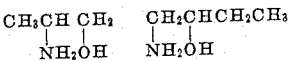

and the cyclization in the fourth step may be accomplished in any well known manner, for example by simple heating in the absence of solvents.

Examples of novel compounds produced by the improved method are as follows:

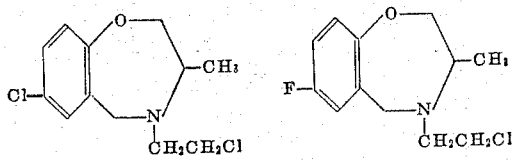

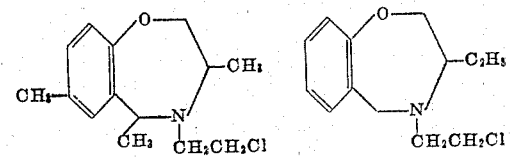

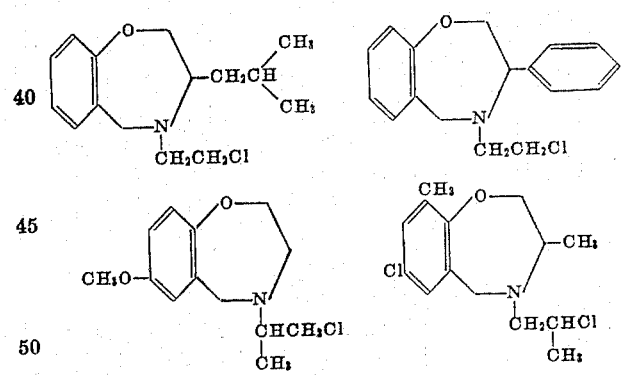

The improved compounds are useful in the treatment of a variety of pathological conditions in the human and other animals. They can be used in the treatment of hypertension, where it induces a prolonged hypotension. They can also be used in the treatment of peripheral vascular diseases, frost bite and other conditions influenced by or caused by peripheral vasoconstriction. They can also be used in the treatment of histamine-induced diseases and vasoconstrictions or tissue engorgements caused by adrenalin induced vasoconstriction.

With between 7 to 10 milligrams per kilo of body weight, substantially complete adrenergic blockage is attained. Therapeutic dosages would depend on degree of adrenergic blockage desired, as well as the speed with which it is desired to be attained, but would necessarily be in amounts less than between 7 to 10 milligrams per kilo of body weight. Amounts as low as 1/10 milligram have been found to be effective. The medicament may be provided in tablet or liquid form, combined with the usual excipients.

While there has been described and illustrated preferred embodiments of the present invention, it is apparent that numerous alterations and omissions may be made without departing from the spirit thereof.

I claim:
1. The improved therapeutically active compounds comprising 3-lower alkyl-4-(beta - chloro lower alkyl-2, 3,4,5-tetrahydro-1,4-benzoxazepine.
2. The improved therapeutically active compound comprising 3-methyl-4-(beta-chloro ethyl)-2,3,4,5-tetrahydro-1,4 benzoxazepine.
3. A compound of the general formula:

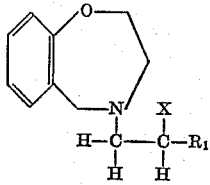

wherein $R_1$ is a member of the class consisting of hydrogen and lower alkyl and X is chlorine.

4. A compound of the formula:

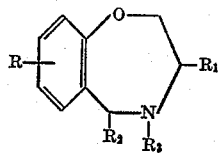

wherein R is selected from the class consisting of hydrogen, chlorine, fluorine, lower alkyl and lower alkoxy, containing from 1 to 5 carbons, $R_1$ is a member selected from the class consisting of hydrogen, lower alkyl containing from 1 to 4 carbons and a monocyclic aryl, $R_2$ is a member selected from the group consisting of hydrogen and methyl, and $R_3$ is a beta chloro lower alkyl.

5. A compound in accordance with claim 4, wherein $R_1$ is a methyl group.
6. A compound in accordance with claim 4, wherein $R_3$ is a beta chloro ethyl.
7. The method of producing a compound having the grouping

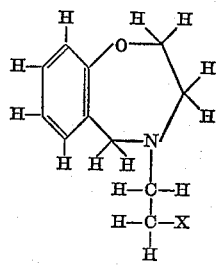

wherein X is chlorine comprising reacting a starting compound having the grouping

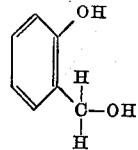

with a chlorohydrin to produce a first reaction product having the grouping

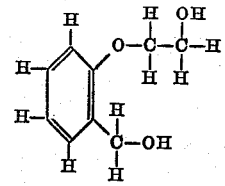

substituting a chlorine for each of the hydroxyl radicals in said first reaction product, reacting said halogenated first reaction product with a beta hydroxyl alkyl amine to produce a second reaction product having the grouping

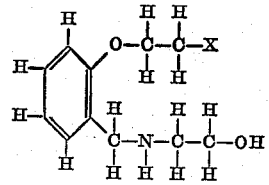

cyclizing said second reaction product to produce a third reaction product having the grouping

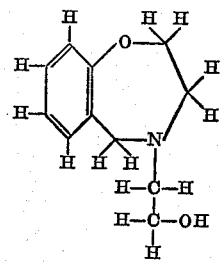

and thereafter substituting a chlorine for the hydroxyl group in said third reaction product.

References Cited in the file of this patent
UNITED STATES PATENTS
2,647,118   Hartough et al. ---------- July 28, 1953

OTHER REFERENCES
Braun et al.: Berichte 54, pp. 685-701 (1921).
Everett et al.: J. Chem. Soc., 1953, 2386-2392.